Feb. 13, 1934.    E. WITTCOFF    1,946,825
SEAT COVER
Filed Dec. 14, 1932    2 Sheets-Sheet 1

INVENTOR
Edward Wittcoff.
By
ATTORNEY

Feb. 13, 1934.  E. WITTCOFF  1,946,825
SEAT COVER
Filed Dec. 14, 1932   2 Sheets-Sheet 2

INVENTOR
Edward Wittcoff.
By *Ralph Ralick*
ATTORNEY

Patented Feb. 13, 1934

1,946,825

UNITED STATES PATENT OFFICE 1,946,825

SEAT COVER

Edward Wittcoff, University City, Mo., assignor to Evr-Kleen Seat Pad Company, St. Louis, Mo., a corporation of Missouri Application December 14, 1932
Serial No. 647,127

4 Claims. (Cl. 155—182)

This invention relates generally to seat-covers and has more particular reference to a portable cover for automobile seats, chairs, and the like.

Seat-covers especially designed for use on automobile seats have been proposed utilizing various forms of wearing surfaces, more especially woven matting surfaces of the so-called "ventilated" type. However, such matting surfaces provide little protection to the seat cushions from dust and dirt seeping through the matting. Such matting-covers are especially cool and comfortable in warm weather and for such reason are desirable in the summer, but, for like reason, are undesirable for use during the winter season.

My invention has for its prime object the provision of a seat-cover of the type described embodying all the advantages and none of the disadvantages of the present widely used matting seat-covers, my present cover including a cushion covering and dirt-protecting fabric body member and a woven matting wearing-surface, which latter may with ease and facility be attached to and removed from the body-members for repair and replacement, and the body-member being further, when the matting-surface is removed, separately usable especially in the winter as a seat-protector.

And with the above and other objects in view, my invention resides in the novel features of form, construction, arrangement and combination of parts hereinafter described and pointed out in the claims.

In the accompanying drawings (two sheets),—

Figure 1:
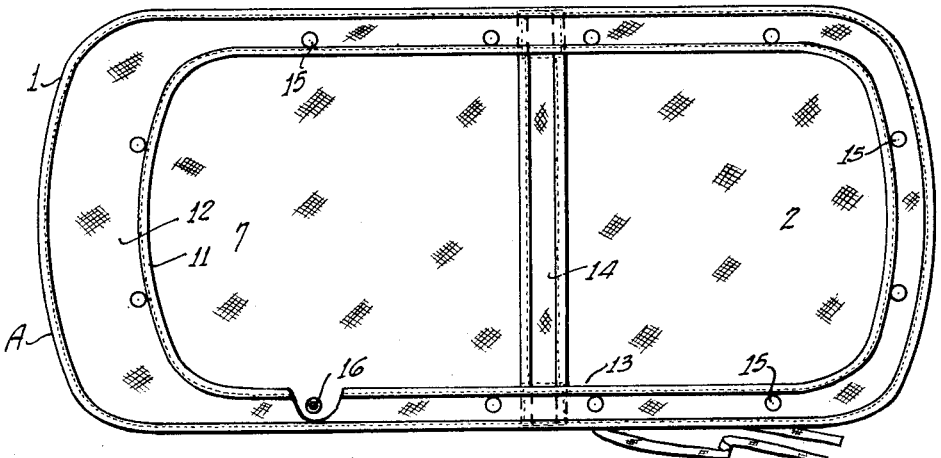
Figure 1 is a partly broken top plan view of the seat-protecting body-member of a seat-cover of my invention.

Referring now more in detail and by reference characters to the drawings, which illustrate a preferred embodiment of my invention, my present seat cover includes a so-called body-member A, which is constructed of any suitable flexible preferably more or less closely woven textile fabric and in plan is of an oblong rectangular shape for protectingly substantially overlying and covering both the seat and back portions of a seat-structure B, as an automobile seat, chair, or the like.

Marginally, the member A has suitably stitched thereto, as shown, a preferably continuous reinforcing edging-strip or binding 1, and a valence or apron 3 is marginally attached, under the edging 1, to and around the end and partially along the sides of the seat-covering portion 2 of member A, the valence 3 being adapted for marginally depending from the member A for draping over the front and sides of a seat-cushion 4 of the automobile seat B.

Figure 2:
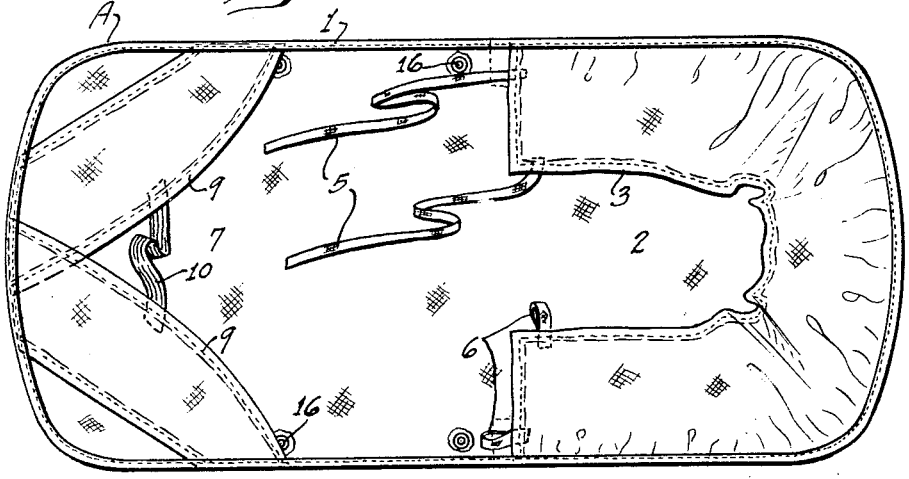
Figure 2 is an inverted plan view thereof.
Figure 3:
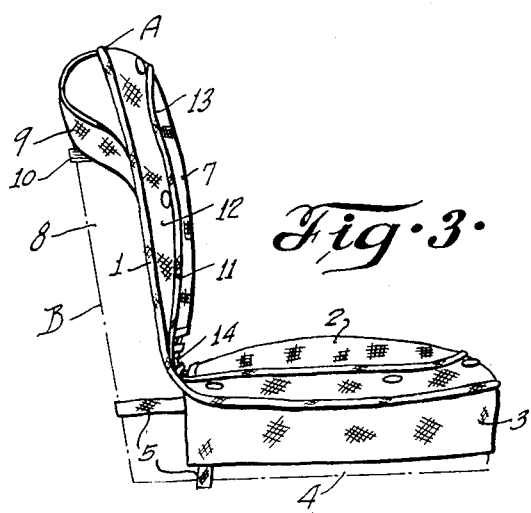
Figure 3 is a reduced side elevational view of the seat-cover as applied to the cushions of an automobile seat.

For removably securing the member A at its portion 2 to the cushion 4, suitable tapes or tie-strings 5 are attached to one end of the valence 3 for disposition one string 5 across the rear end of the cushion 4 and the other string 5 under the end of the cushion, for connection with respective loops 6 attached to the opposite end of the valence 3, as best seen in Figures 2 and 3.

For removably securing the member A at its other half or back-cushion covering portion 7 to the back-cushion 8 of the automobile-seat or the like B, the cover-portion 7 is provided with a pair of suspender-straps 9 endwise attached under the edging strip 1 and extending from a medial point of the end-margin of the cover-portion 7 in respectively opposite diagonal directions to the adjacent side margin of the cover-portion 7 for loop-wise engaging the upper corners of the seat back-cushion 8, a suitable band 10 of elastic webbing or the like being attached to and between the straps 9 for biasing the same and the upper end of the member A in engaging relation with the cushion 8, as best also seen in Figures 2 and 3.

Having its outer margin disposed under and stitched with the binding 1 to the body A and having its inner margin normally free from the body A and preferably likewise strengthened and re-inforced by an edging-strip or binding 11, is a flap 12 which, as best seen in Figure 1, is disposed over substantially the entire marginal portion of the front or wearing-face of the protector or member A, and which is of such width dimension, as shown, to form with the body A a marginal-pocket 13, for purposes presently appearing.

Extending transversely of the body-member A and merely endwise attached to, and at an intermediate point of, the respective opposite side wall portions of the flap-member 12, is a crotch-band or hold-down strap 14 suitably marginally bound or edged as shown, the strap 14 being intermediately free from the body-member A and being disposed in such position as to reside, when the protector A is in use, substantially at the crotch between the cushions 4 and 8, as best seen in Figure 3.

Adjacent its inner margin, the flap-member 12 is provided with a marginally spaced series of snap-fastener female elements 15, of which there are preferably six in the U-shaped portion of the flap 12 bounding the cover-portion 2, and a like number in the opposite U-shaped portion of the flap 12 bounding the cover-portion 7, the fastening elements 15 being adapted for co-operable engagement with a corresponding series of snap-fastener male elements 16 mounted on and in the body-member A, as best seen in Figures 1 and 2.

C, D, respectively, designate a pair of replaceable wearing-sections each of preferably two-ply construction, the outer wearing ply 17 thereof being composed of a loosely woven, somewhat stiff yet flexible material having preferably, though not necessarily, so-called "ventilated" characteristics, such as woven matting of fibre, straw, paper, or the like, and the other or backing-ply 18 thereof being composed preferably of a suitable textile fabric, as burlap cloth or the like. The two members or plies 17, 18, are suitably, as by spaced transverse rows of stitching 19, permanently secured together in flatwise registering relation, each respective wearing-section C, D, being preferably marginally bound and reinforced by an edging-strip 20.

Figure 4:
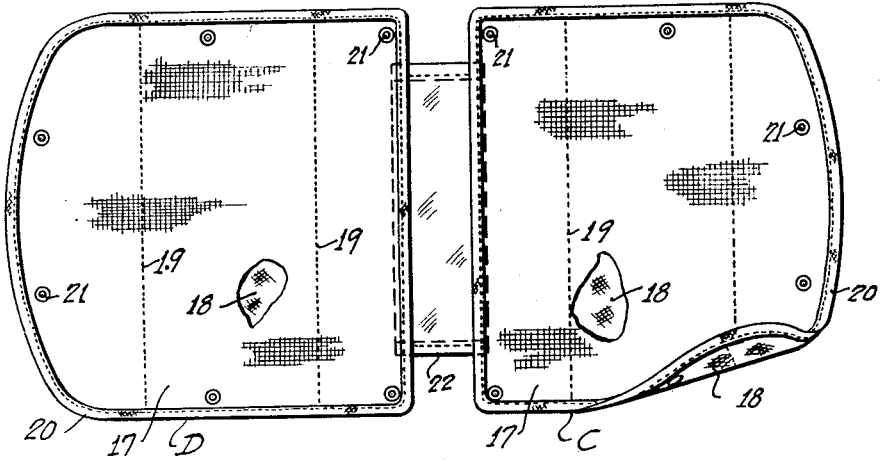
Figure 4 is a top-plan view of the removable wearing-surface sections of the cover.
Figure 6:
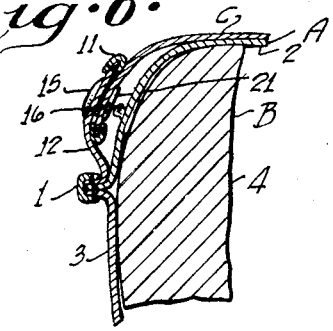
Figure 6 is an enlarged fragmentary sectional view of the complete seat-cover as applied to a seat-cushion.

The co-operable fastener-elements 15, 16, being disengaged, the section C is in shape and dimensions for disposition upon the outer face of the cover-portion 2 of the body-member A with its opposite side and outer end margins disposed within the pocket 13. As so operatively disposed, the section C at its said marginal portions is overlapped by the flap-member 12 and is provided with a marginally spaced series of snap-fastener male elements 21 disposed for co-operation with the flap-carried fastener female elements 15, as best seen in Figures 4 and 6.

In a similar manner, the section D is in shape and dimensions adapted for disposition upon the outer face of the back-cover portion 7 of the body-member A for marginally residing between the flap 12 and the body member A, the section D having also a marginally spaced series of the snap-fastener male elements 21 disposed for co-operation with the flap-carried fastening elements 15.

Figure 5:
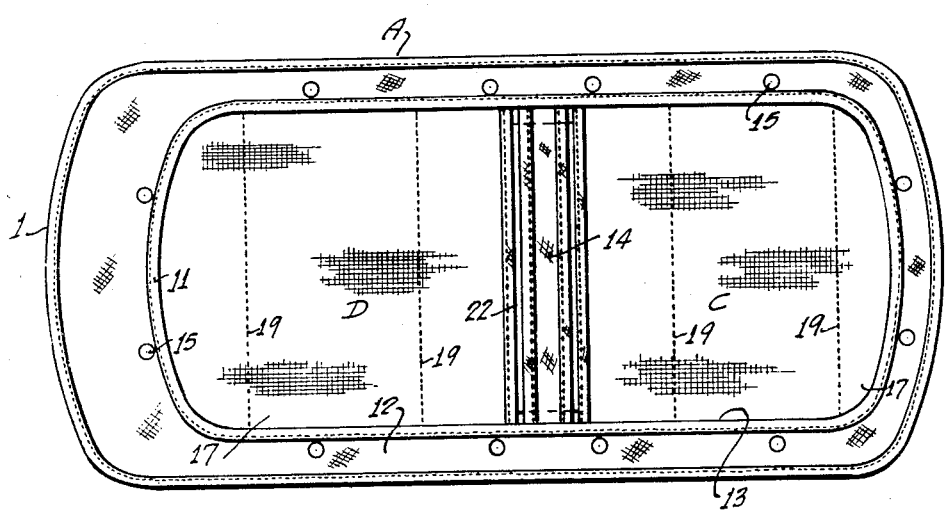
Figure 5 is a plan view of the body-member of the cover equipped with the removable wear sections.

The opposing inner end margins of the sections C, D, are preferably connected in spaced relation by means of a hinge-strap or member 22, the length of which, that is to say, its extent transversely of the sections C, D, is less than the width thereof, as shown, for convenience in assembling the sections C, D, on the body-member A, the strap 22 then residing under the crotch-band 14 with the latter disposed intermediate the opposing end margins of the sections C, D, as best seen in Figure 5.

In use, one or the other of the wearing sections C, D, is inserted endwise under the strap 14 for disposition of the sections C, D, on the body-member A, as described, with their outer marginal portions disposed in the pocket 13, the sections C, D, being then removably attached to the body A by engaging the snap-fastening elements 15 and 21 together. The cover A, C, D, is then mounted on the seat B with the cover portion 2 disposed on the seat-cushion 4 and the wearing-section C consequently horizontally flatwise overlying the cushion 4, the valence 3 being draped over the sides of the cushion 4 and the tie-strings 5 employed as described for securing the member A at its portion 2 to the cushion 4.

The cover portion 7 is then disposed upon the back-cushion 8 with the wearing section D more or less vertically overlying the cushion 8, the corner-straps 9 being engaged with the upper corners of the cushion 8 and the band 14 then residing approximately at the crotch between the cushions 4 and 9, as described, and shown in Figure 3.

As will be seen, in such use my new seat-cover is most efficient in the performance of its intended functions, the body-member A serving for substantially protecting the cushions 4, 9, from dirt and dust seeping through the matting sections C, D, and the latter providing a cool, comfortable and satisfactory wearing surface most agreeable to the occupant of the seat B, the sections C, D, further providing the necessary stiffness for retaining the shape of the seat-cover when in use on the seat-structure B.

As the wearing-surface sections C, D, become worn from use, the same may, as will be obvious, be readily removed and new sections substituted therefor, and, since the sections C, D, are of very simple construction and most inexpensively manufactured, such replacement may be effected at small expense and with the utmost facility.

Figure 7:
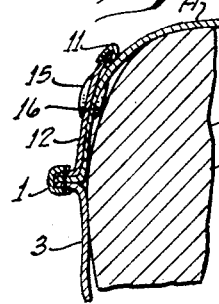
Figure 7 is a similar view with the wearing-surface section removed.

However, if desired, for winter use, the wearing sections C, D, may be removed and eliminated, the flap-member 12 being then secured neatly flatwise upon the body-member A by merely engaging the snap-fastener elements 15, 16, together, as best seen in Figure 7.

It will be understood that changes and modifications in the form, construction, arrangement and combination of the several parts of the cover may be made and substituted for those herein shown and described without departing from the nature and principle of my invention.

Having thus described my invention, what I claim and desire to secure by Letters-Patent is,—

1. In a seat-cover, in combination, a fabric body-member for protectingly overlying a seat, means on the under face of said member for detachably securing the body-member upon a seat, a flexible flap fixed at its outer margin to, and extending around and overlying the marginal portion of the upper face of, said member, a matting section marginally throughout its contour interposed between said flap and body-portion and marginally concealed by the flap, and co-operable members on the section and flap for removably securing the section to the flap in flatwise overlying relation both to the body-member and to the seat.

2. In a removable seat-cover, in combination, a fabric body-member for protectingly overlying a seat, a fabric flap fixed at a margin to, and overlying the marginal portion of the upper face of, said member, a matting section marginally underlying the flap, spaced co-operable snap-fastener elements on the matting section and the flap for detachably securing said section in flatwise overlying relation to the body-member, and other snap-fastening elements on the body-member for engaging the flap-carried elements for securing the flap at its free margin to the body-member on removal of the matting section.

3. In a removable cover for a seat and its back, in combination, a fabric body-member overlying the seat and its back, a flexible flap fixed at a margin to, and extending continuously around and overlying the marginal portion of the upper face of, said member, hingedly connected matting sections underlying the flap throughout their outer marginal portions, spaced series of co-operable members on the matting sections and the flap for detachably securing the sections in flatwise overlying relation to the body-member, and a transverse strap fixed to the flap for overlying the matting sections intermediate their opposite ends.

4. In a combined seat and back cover, a fabric body-member of oblong rectangular contour for protectingly overlying a seat and its back, means on the under face of said member for detachably securing the same upon a seat and its back, a flexible flap fixed at its outer margin to, and extending around and overlying the marginal portion of the upper face of, said member, hingedly connected seat and back matting-sections marginally interposed between the flap and body-portion and concealed throughout their outer marginal portions by the flap, and spaced series of co-operable fastening members on the matting-sections and flap for removably securing said sections to the flap in flatwise overlying relation to the body-member and also to the seat and back.

EDWARD WITTCOFF.

CERTIFICATE OF CORRECTION.

Patent No. 1,946,825. February 13, 1934.

EDWARD WITTCOFF.

It is hereby certified that the name of the assignee in the above numbered patent was erroneously described and specified as "Evr-Kleen Seat Pad Company" whereas said name should have been described and specified as Evr-Klean Seat Pad Company, as shown by the records of assignments in this office; and that the said Letters Patent should be read with this correction therein that the same may conform to the record of the case in the Patent Office.

Signed and sealed this 20th day of March, A. D. 1934.

F. M. Hopkins (Seal) Acting Commissioner of Patents.